Sept. 27, 1966     E. V. BUNTING ET AL     3,275,085
POWER OPERATING AND CONTROL SYSTEM FOR TRACTORS
Filed Aug. 1, 1962                          9 Sheets-Sheet 1
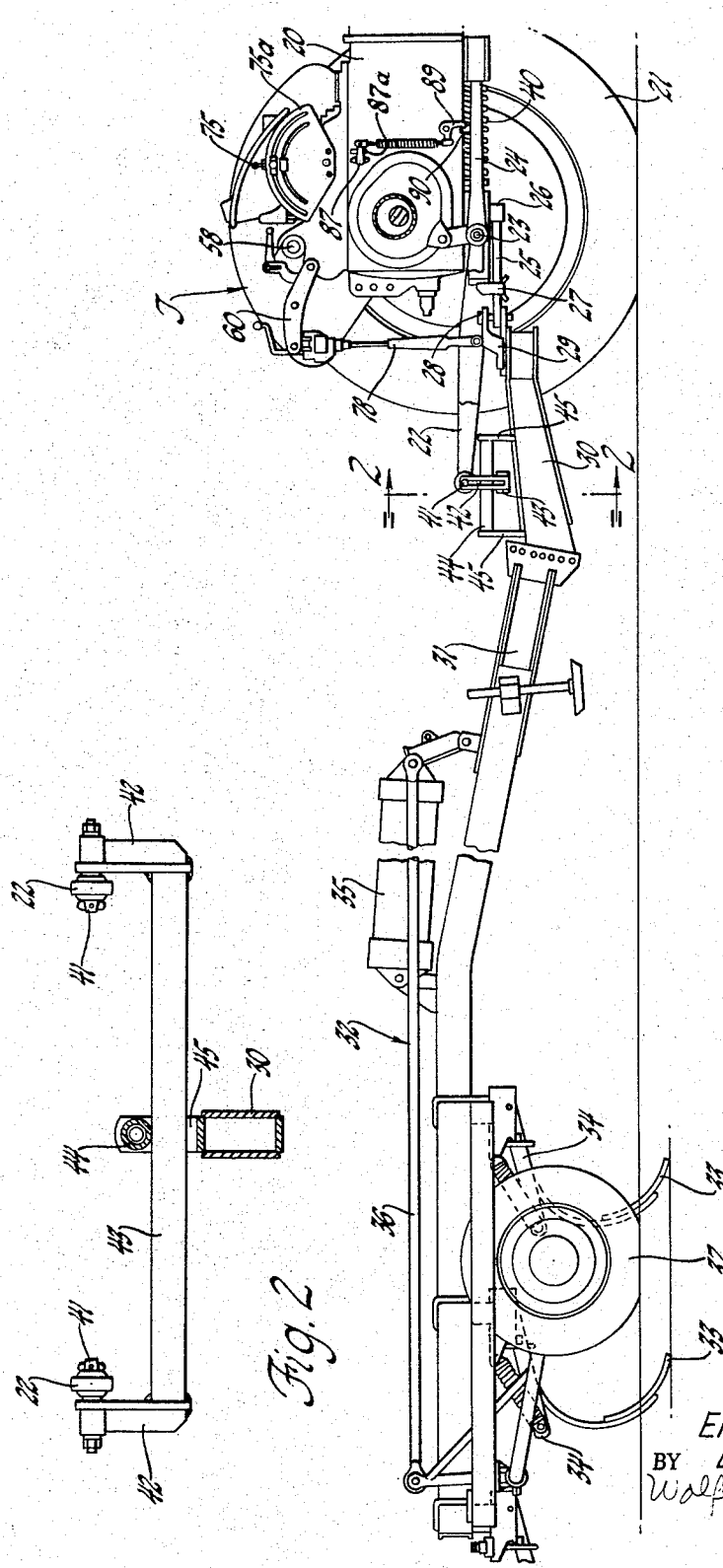
INVENTORS.
ERNEST V. BUNTING
BY EDWIN J. SKIBA
Wolfe, Hubbard, Voit
& Osann
ATTORNEYS.

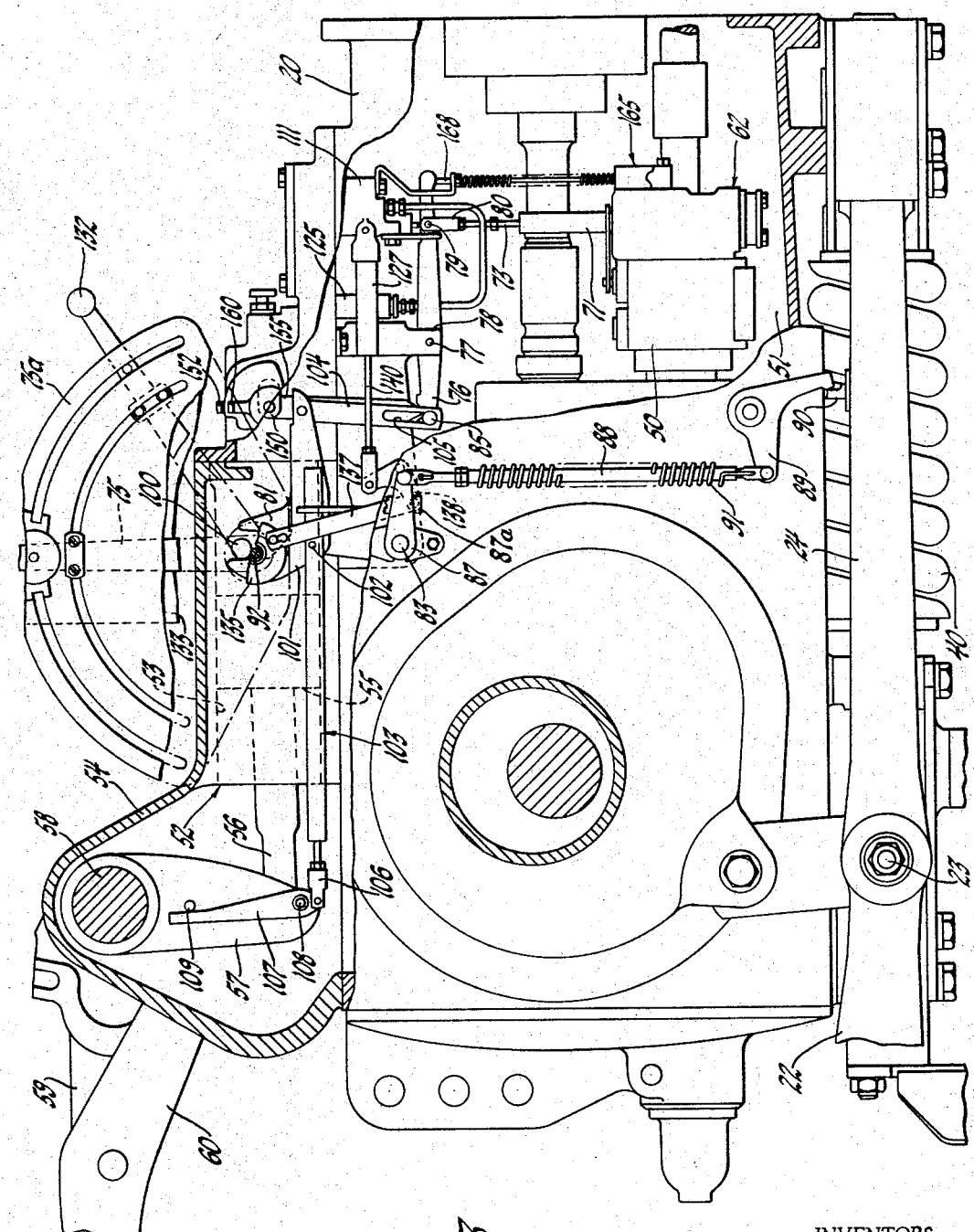

INVENTORS.
ERNEST V. BUNTING
EDWIN J. SKIBA
BY
ATTORNEYS.

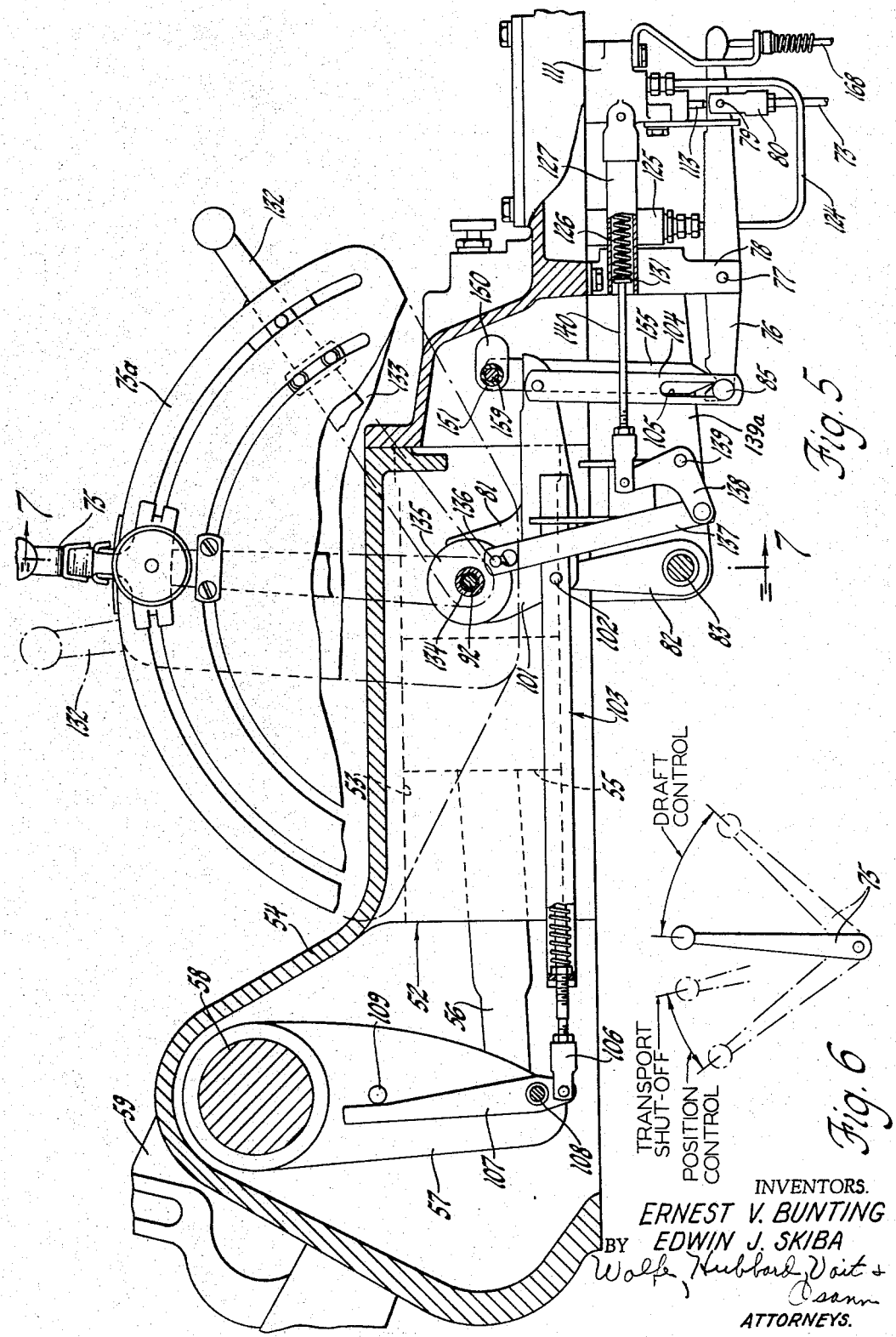

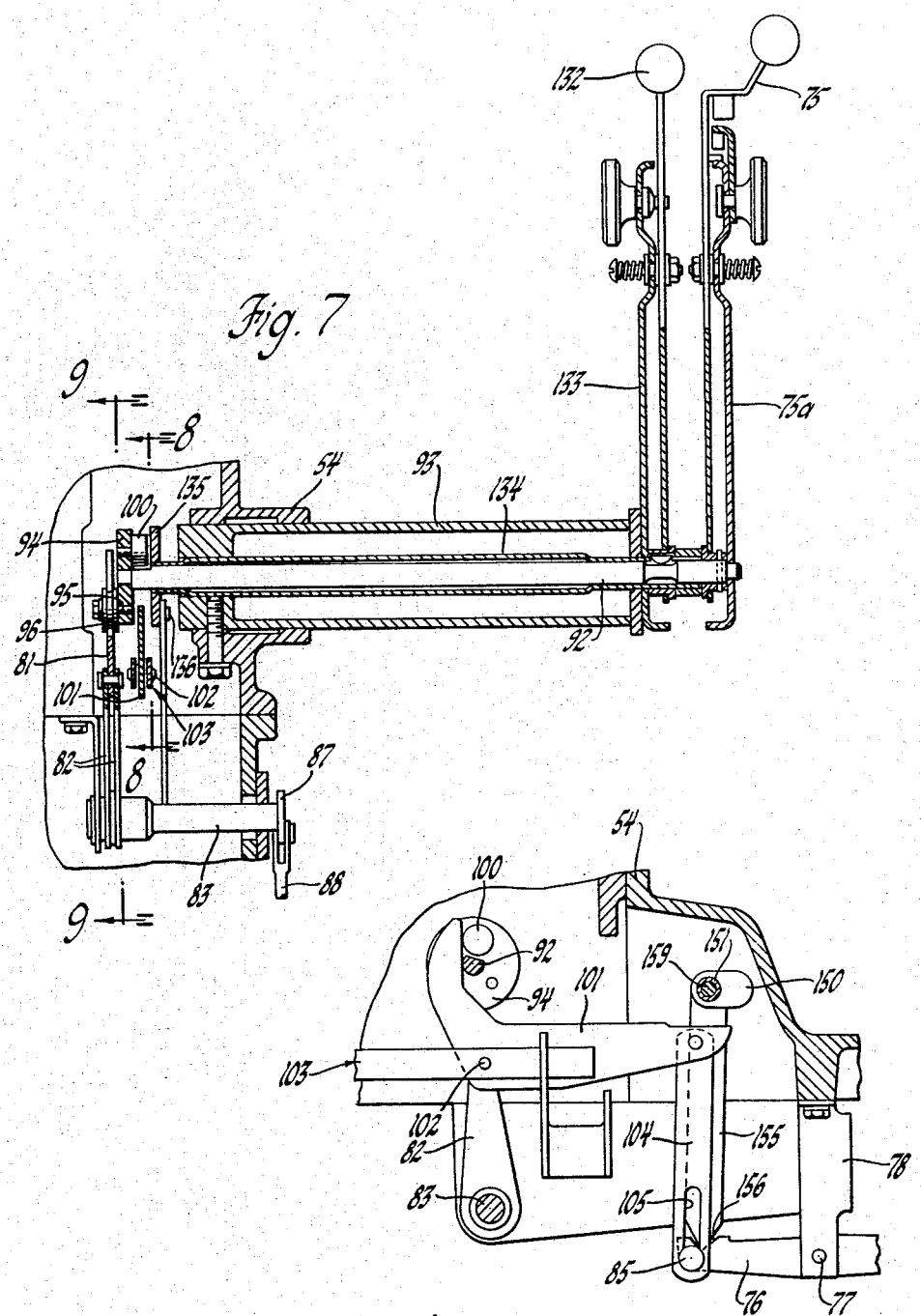

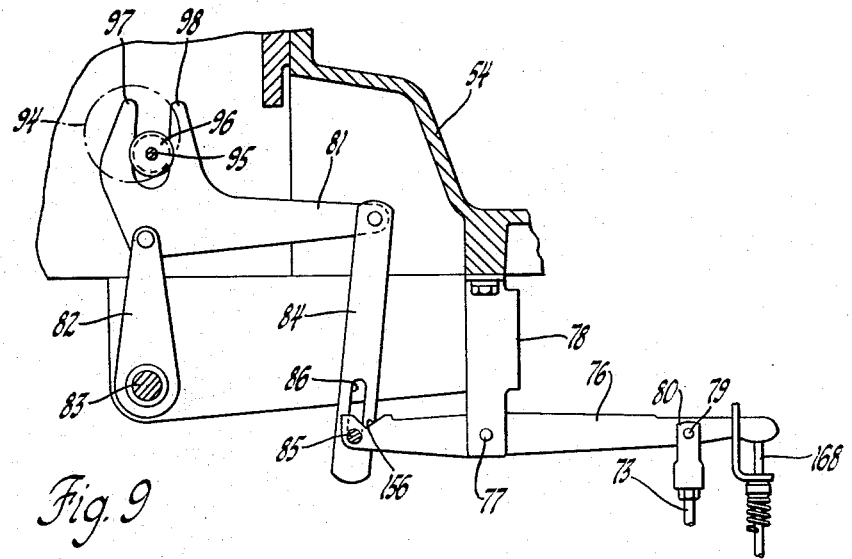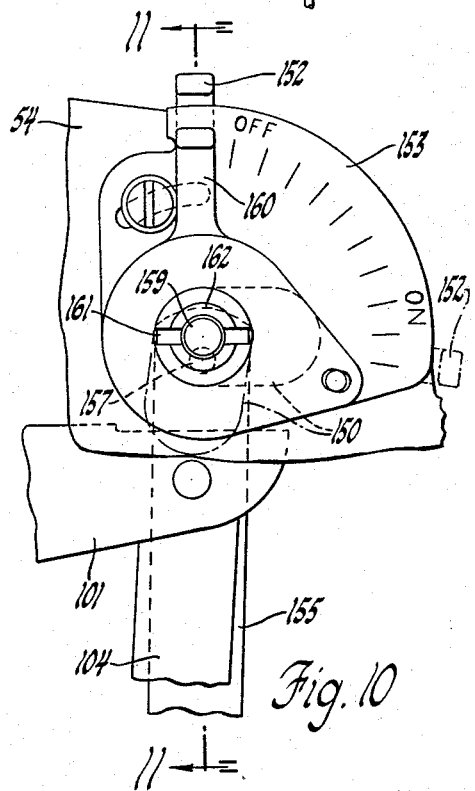

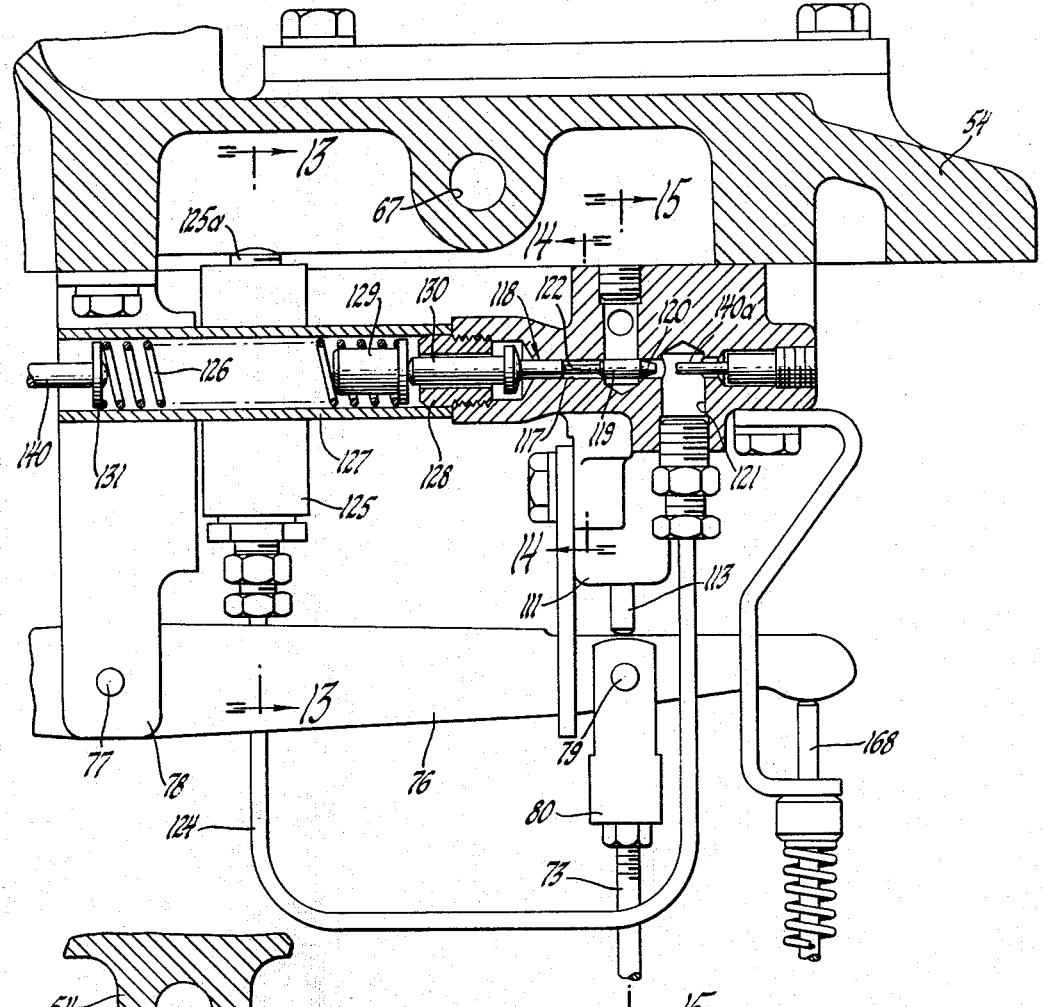
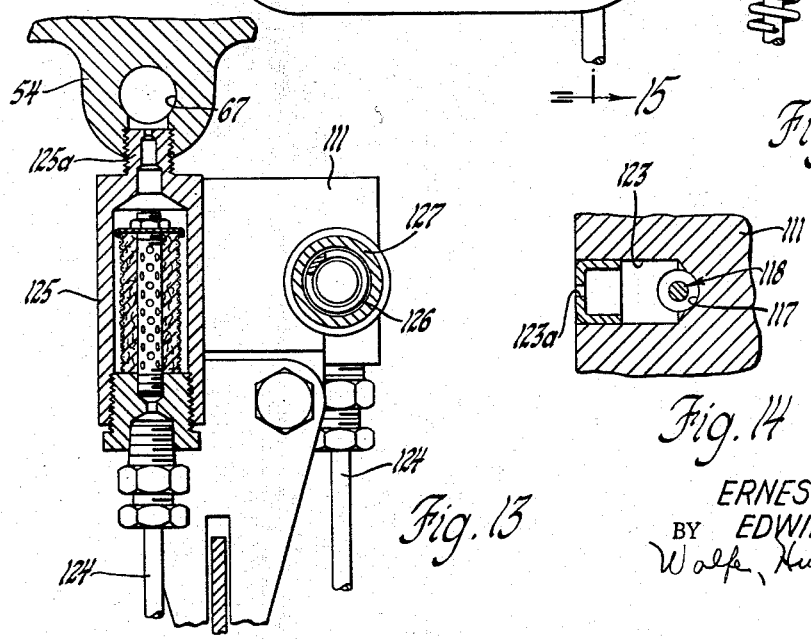
Fig. 12
Fig. 14
Fig. 13
INVENTORS.
ERNEST V. BUNTING
BY EDWIN J. SKIBA
ATTORNEYS.

Sept. 27, 1966 E. V. BUNTING ETAL 3,275,085
POWER OPERATING AND CONTROL SYSTEM FOR TRACTORS
Filed Aug. 1, 1962 9 Sheets-Sheet 8

INVENTORS.
ERNEST V. BUNTING
BY EDWIN J. SKIBA

ATTORNEYS.

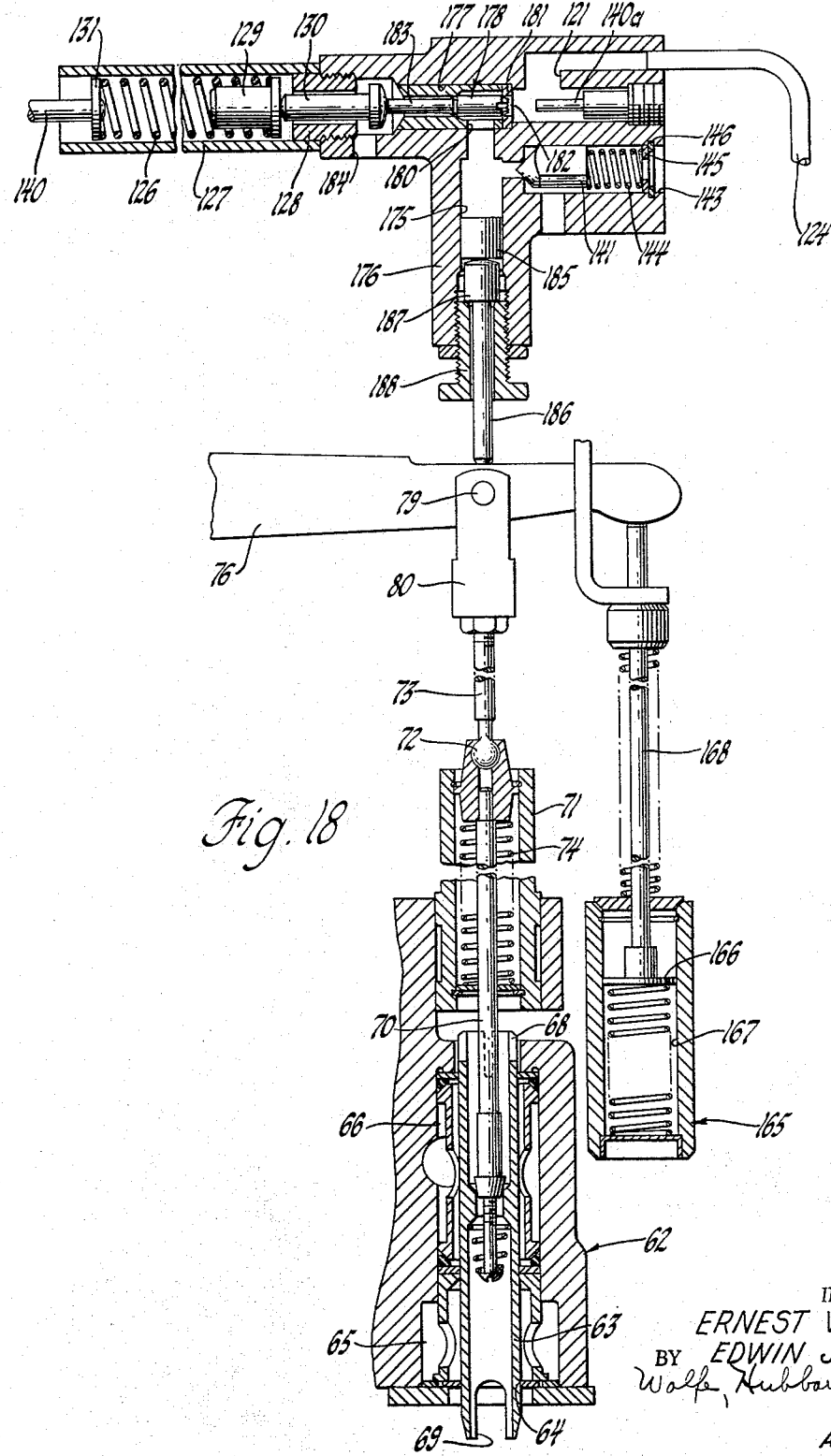

United States Patent Office 3,275,085
Patented Sept. 27, 1966

3,275,085
POWER OPERATING AND CONTROL SYSTEM FOR TRACTORS
Ernest V. Bunting, Detroit, and Edwin J. Skiba, Warren, Mich., assignors to Massey-Ferguson Inc., Detroit, Mich., a corporation of Maryland
Filed Aug. 1, 1962, Ser. No. 214,123
24 Claims. (Cl. 172—10)

The invention relates to controls for hydraulic systems of the type provided in tractors for raising and lowering attached implements and for regulating their working depths.

Modern tractors of the above general character are capable of operating with a wide variety of implements differing substantially in dimensions, weight and mode of operation. Many of the lighter weight implements are mounted on the tractor by means of a vertically swingable hitch which permits the implement to be raised between ground working and transport position by lift means which is usually pressure fluid operated and incorporated in the tractor. Other implements, usually those of great weight, may be connected so that they are simply towed or pulled behind the tractor. With a third type of connection, intermediate the above discussed types, the implement is semi-mounted on the tractor, that is, connected to be towed by the tractor while the lift mechanism is connected in a manner enabling it to exert a lifting force on the implement so as to transfer some of the implement weight to the tractor drive wheels.

One object of the invention is to provide improved controls for tractor hydraulic lift mechanisms of the above general character which enables a tractor to operate more effectively with implements coupled thereto by any of the above-mentioned connections and which, in the case of semi-mounted implements, permits the lift mechanism to maintain a substantially constant weight transfer from the implement to the tractor at a value preselected to best meet the requirements of prevailing operating conditions.

Another object is to provide controls which afford more precise regulation of the lift mechanism under either automatic draft control or manual control.

Still another object is to provide improved controls which enable the pressure fluid source for the tractor lift mechanism to be used more effectively for the operation of auxiliary actuators.

A further object is to provide controls for a tractor hydraulic system equipped for either position or automatic draft control in which the selection of the type of control to be employed and the setting of the system for operation under the selected control is effected simply and efficiently by means of a single control lever.

Other objects and advantages of the invention will become apparent from the following detailed description of the preferred embodiment and modification illustrated in the accompanying drawing, in which:

FIGURE 1 is a side view of the rear portion of a tractor and semi-mounted implement embodying the features of the invention, the tractor drive wheel on the near side being omitted and parts of the tractor broken away to show details of the construction.

FIG. 2 is a transverse sectional view through the tractor implement hitch linkage taken in a plane substantially on the line 2—2 of FIG. 1.

FIG. 3 is an enlarged partly section side view of the rear portion of the tractor shown in FIG. 1.

FIG. 5 is an enlarged fragmentary sectional view through the upper rear portion of the tractor showing details of the control linkages and associated elements.

FIG. 6 is a diagrammatic view showing the various positions of the manual control or quadrant lever.

FIG. 7 is a fragmentary sectional view taken in a vertical plane substantially on the line 7—7 of FIG. 5.

FIG. 8 is a fragmentary sectional view taken in a vertical plane substantially on the line 8—8 of FIG. 7.

FIG. 9 is a fragmentary sectional view taken in a vertical plane substantially on the line 9—9 of FIG. 7.

FIG. 10 is a fragmentary side view of the external portion of the pressure and limit controls with a portion of the tractor housing broken away to show cooperating internal elements of the controls.

FIG. 11 is a fragmentary sectional view taken in a vertical plane substantially on the line 11—11 of FIG. 10.

FIG. 12 is a sectional view through the pressure responsive valve means of the weight transfer portion of the controls.

FIG. 13 is a fragmentary sectional view taken in a vertical plane substantially on the line 13—13 of FIG. 12.

FIG. 14 is a fragmentary sectional view taken on a vertical plane substantially on a line 14—14 of FIG. 12.

FIG. 18 is a sectional view of a modified form of the pressure responsive valve means of the type shown in FIG. 12 together with a sectional view of the main control valve of the tractor hydraulic system.

The tractor and implement hitch

Figure 4:
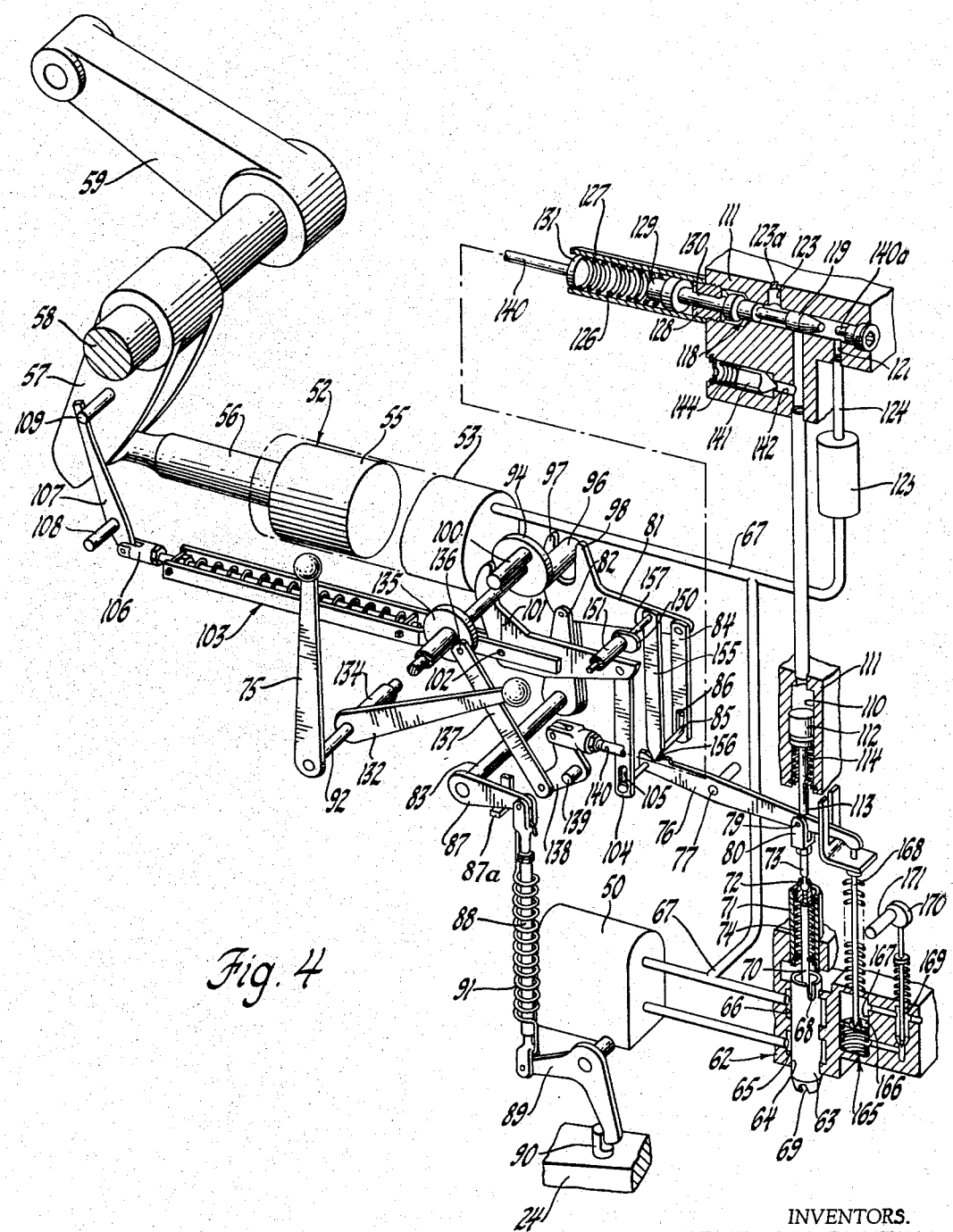
FIG. 4 is a perspective view diagrammatically showing the relationship between the lift mechanism and the control incorporated in the tractor.
Figure 15:
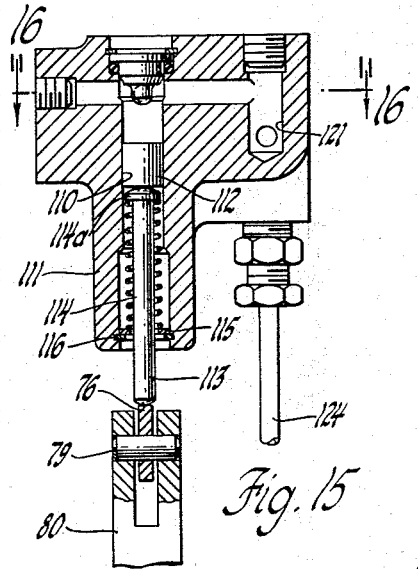
FIG. 15 is a fragmentary sectional view taken in a vertical plane substantially on a line 15—15 of FIG. 12.
Figure 16:
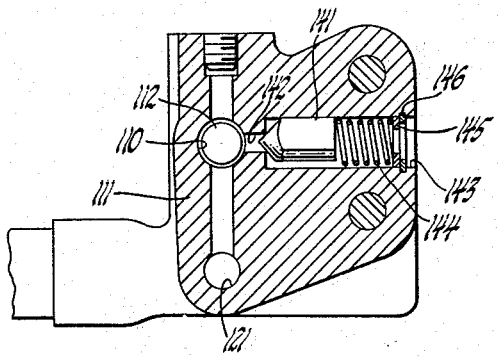
FIG. 16 is a fragmentary sectional view taken in a horizontal plane substantially on a line 16—16 of FIG. 15.

For purposes of illustration the invention has been shown as embodied in a tractor T having a rear housing 20 which, together with the usual transmission housing and engine, form a frameless tractor body supported by dirigible front wheels and rear drive wheels, of which one pneumatically tired wheel 21 is shown in FIG. 1. The exemplary tractor is equipped with a three-point implement hitch of the general type shown in the Bunting Patent No. 2,996,125 for mounted implements and with a drawbar hitch for semi-mounted and pull-behind implements. As the illustrative embodiment involves a semi-mounted implement only, the lower or draft links 22 of the three-point hitch have been shown. As is customary, the links 22 converge forwardly and are pivoted at their forward ends as at 23 (FIGS. 1 and 3) to a longitudinally movable frame 24 supported adjacent the underside of the housing 20.

For coupling with pull-behind implements and semi-mounted implements, the hitch linkage includes a drawbar 25 pivoted at its forward end as at 26 to the frame 24 to swing in a horizontal plane. The drawbar is guided in its swinging movements and its range of movement is limited by a guide frame 27 carried at the rear end of the frame 24. The trailing end of the drawbar 25 is suitably apertured for the reception of a coupling pin 28 by which connection is effected with a clevis 29, herein shown as forming a part of a tongue 30 extending forwardly from the frame 31 of an implement 32.

The implement 32 shown simply by way of illustration, is a ground working implement equipped with a series of ground working tools or tines 33 mounted on the frame by means of cranks 34 so that they may be raised and lowered between the ground working and retracted positions. Such raising and lowering of the tines is effected by an actuator herein shown as a cylinder 35 pivotally anchored at one end to the implement frame 31 and having its working piston connected by a link 36 and the tines mounting cranks. The implement is adapted to ride on ground wheels 37 which support the major portion of its weight.

The construction and mounting of the frame 24 is similar to that shown in the above-mentioned Bunting patent, No. 2,996,125. For present purposes, it is sufficient to note that it is supported for movement longitudinally of the tractor and that its movement rearwardly under draft load imposed by either the links 22 or the drawbar 25 is resisted by a spring 40. Movement of the frame against the resistance of the spring brought about by draft loads are utilized to actuate controls for the tractor hydraulic system to initiate raising or lowering of the links 22 as will appear presently.

When the tractor is used to operate implements such as the tiller 32, the links 22 are utilized to transfer weight from the implement to the tractor, thereby increasing the loading of the tractor drive wheels and consequently increasing their traction. For this purpose the trailing ends of the links 22 are pivotally connected by pins 41 with upright legs 42 rigid with opposite ends of a transversed lift bar 43, the legs and bar forming a relatively wide U-shaped frame. The bar 43 is disposed in underlying relation to a fore-and-aft extending bar 44 rigidly mounted on the vehicle tongue 30 by means of upright brackets 45 welded to opposite ends of the bar and to the tongue. The bar 44 is located so that the lifting bar 43 crosses substantially at its midpoint when the implement is alined fore-and-aft of the tractor, thus allowing the implement to swing to either side of the lift bar.

*Hydraulic lift mechanism*

In the illustrative embodiment of the invention raising and lowering of the links 22 is accomplished by means of a hydraulic system which, as shown in FIGS. 3 and 4, includes a pump 50 immersed in fluid such as oil in a reservoir 51 formed by the walls of the tractor housing 20. The pump is driven by the tractor engine and is capable of drawing oil from the reservoir 51 and delivering it under pressure to a main actuator 52. The particular actuator shown is a one-way ram comprising a cylinder portion 53 formed integrally with or suitably mounted within a cover plate 54 mounted on and enclosing an opening in the upper wall of the housing 20. The cylinder opens to the rear and is fitted with a piston 55 having a connecting rod 56 projecting rearwardly. The rearward portion of the rod is ball-shaped and is received in the socketed lower end of an arm 57 rigidly mounted on and extending radially from a transverse rock or lift shaft 58 having its intermediate portion journalled in the cover plate 54. Each end of the lift shaft has a crank arm 59 splined to it and connected by a lever 60 and drop link 78 with one of the links 22.

When pressure fluid is supplied to the closed end of the cylinder 53, the piston and its piston rod are forced rearwardly, and the crank arms 59 swing upwardly to raise the links 22. Conversely, when fluid is exhausted from the cylinder 53 the piston 55 retreats into the cylinder due to the weight of the links and the load imposed thereon so that the links 22 swing downwardly. Furthermore, when an implement coupled with the tractor through the links 22 is in a ground working position, fluid may be maintained in the cylinder so that the implement is partially supported on the rear of the tractor and a part of the weight of the implement is added to that of the tractor to increase the traction of the drive wheels 21. In the case of a semi-mounted or pull-behind implement, a portion of the weight of the implement transmitted through the coacting bars 43 and 44 is transferred through the linkage to the actuator and thus added to the weight of the tractor to increase the traction of the drive wheels.

The volumetric rate at which oil is supplied to or exhausted from the cylinder 53 determines the rate at which the implement is either raised or lowered. In the present system oil is supplied from the pump 50 driven continuously by the engine and, since the engine speed necessarily varies to meet the various demands of the tractor, delivery rate is controlled by varying the amount of oil permitted to enter the pump. Such control is obtained through the medium of valve mechanism 62 which also controls the rate at which fluid can escape from the ram or actuator 53.

*Control valve mechanism*

The valve mechanism 62 as herein shown is mounted at one end of the pump body and like the pump is immersed in the oil in the reservoir 51. As shown in FIG. 4, the valve mechanism includes a generally tubular flow control means or plunger 63 supported for axial movement in a bore 64 which intersects spaced chambers 65 and 66 formed in the valve body. Chamber 65 in this instance communicates with the intake of the pump 50 while chamber 66 communicates with the pressure fluid outlet of the pump. As will be seen by reference to FIG. 4, the pressure fluid outlet of the pump is connected by conduit means 67 with the closed end of the actuator cylinder 53 and a branch of the conduit establishes communication with the chamber 66.

The parts of the valve mechanism 62 are proportioned so that when the plunger 63 is in a central or neutral position as shown in FIGS. 4 and 18, its outer surface closes both the chamber 65 and the chamber 66 so that the flow of fluid to the pump inlet is blocked and exhaust of fluid from the actuator is likewise blocked. As the valve plunger is moved axially downwardly from its neutral position, a pair of narrow axially extending slots 68 at the end of the plunger move past the upper wall of the chamber 66 and permit fluid to escape from the actuator through the open end of the valve bore to the reservoir. Any fluid under pressure delivered by the pump also exhausts through such path, although it is to be noted that the plunger at this time closes off the chamber 65 and thus blocks the pump intake against the entrance of fluid.

The maximum rate of lowering of the implement hitch linkage depends on the rate at which fluid can escape from the actuator 53. This in turn is dependent upon the effective discharge area presented by the slots 68 which are exposed to the chamber 66. The slots are constructed and arranged so that as the plunger is moved downward from a neutral position the volume of escaping oil increases progressively so that the implement will drop at an increased rate until the effective area of the slots reaches a maximum.

As the plunger 63 moves upwardly from the neutral position the chamber 66 remains closed by the outer surface of the plunger and a pair of slots 69 in the lower end of the plunger pass upwardly into the chamber 65. Oil in the reservoir is then free to enter the chamber 65 and enter the pump intake. The oil is then forced by the pump to the hydraulic actuator 52 causing the piston rod 56 to move rearwardly and swing the crank arms 59 upwardly for raising the links 22.

Mechanism for moving the valve plunger 63 includes a plunger rod 70 which has a yieldable connection at its lower end with the valve plunger and which has its upper end projecting into a cylindrical housing 71 supported at the top of the valve housing. Connection is effected through the medium of a ball-and-socket connector 72 with a valve operating rod 73 extending upwardly from the housing for connection with actuating mechanism to be described hereinafter. A coiled spring 74 enclosed in the housing 71 reacts with the rod 70 to urge the rod and attached valve plunger 63 upwardly or toward a supply position.

*Valve actuating mechanism*

The mechanism for actuating the main control valve 62 affords both automatic draft control and position control. Additional controls provided by the instant invention enable the valve to be operated to adapt the hydraulic system for supplying pressure fluid for the operation of auxiliary actuators and for maintaining constant weight transfer from an implement to the tractor when the latter is used with implements of the semi-mounted or pull-behind types.

In the case of automatic draft control corrective movements of the valve plunger 63 are effected in response to movements of the control frame 24 by or against the force exerted by the control spring 40 as the draft load imposed by the implement decreases or increases with respect to a value selected manually by the setting of a manual control element in the form of a quadrant lever 75. As shown in FIGS. 1 and 7 the quadrant lever is mounted alongside the usual quadrant 75a fixed to the tractor housing at one side of the driver's seat within convenient reach of the tractor driver. Upon an increase in draft load the valve plunger 63 is shifted to a supply or "raise" position and the hitch and attached implement are raised until the ground reaction on the soil engaging elements produces a draft load effective to balance the force of the spring 40 and return the valve plunger to the neutral position. Upon a decrease in the draft load, the valve plunger is shifted to the exhaust or "drop" position and the implement is lowered until the draft load again balances the force of the spring 40 and returns the valve plunger to the neutral position.

In position control the lift arms 59 and the hitch links 22 to which they are connected execute a true follow-up action, that is, they are raised or lowered to correspond to the positioning of a manual control element within its prescribed range of movement. The present invention provides novel mechanism whereby the quadrant lever 75 used for draft control as above explained, also functions as the manual control element for position control. Furthermore, this quadrant lever serves as a convenient means for selectively determining under which of the two types of control the hydraulic system is to operate. More specifically, selection of the type of control is determined by the direction in which the quadrant lever is moved from the neutral position in which it is shown in FIG. 4. In the exemplary system forward swinging of the lever selects automatic draft control, rearward swinging selects position control.

In the exemplary control system both types of control are effected through a valve actuating lever 76 pivoted as at 77 on a stationary bracket 78 fixed to and depending from the housing cover plate 54. One end of the lever 76 extends over the valve mechanism 62 and is pivotally connected by a pin 79 and yoke 80 to the upper end of the valve operating rod 73.

*Draft control*

The draft control mechanism includes a cam lever 81 pivotally mounted adjacent one end on an upright arm 82 fixed to a horizontally disposed shaft 83 journalled on a bracket depending from the housing cover plate 54 and having one end projecting through the side wall of the housing 20. At its other end the cam lever 81 is pivotally connected to a link 84 which is also connected to the end of the valve actuating lever 76 remote from the valve. As will be seen by reference to FIG. 4 the latter connection is effected by means of a cross pin 85 extending through the end of the lever 76 and engaging in a slot 86 in the lower end of the link 84. With this arrangement the cam lever 81 is enabled to transmit positive movements to the valve lever when it is rocked anticlockwise but it does not interfere with similar movement of the lever by the companion control elements when required.

The pivot for the cam lever 81 is shiftable fore-and-aft by changes in the draft load as evidenced by movements of the control frame 24 which act to rock the shaft 83. Movements of the frame are transmitted to the shaft through an arm 87 fixed thereto and connected by a link 88 with one arm of a bell crank 89 pivoted on the tractor housing and located externally thereon. The other arm of the bell crank 89 is positioned in the path of a stop in the form of a stud 90 provided on the control frame 24. The spring bias on the main valve plunger acting through the above described linkage yieldably urges the bell crank against the stop. Accordingly upon rearward movement of the frame 24 the bell crank is rocked clockwise about its pivot and the cam lever is shifted rearwardly by the spring action. This following movement of the draft control linkage is limited by a stop 87a located in the path of the arm 87 as shown in FIGS. 1, 3 and 4. Upon forward movement of the control frame the bell crank is rocked anticlockwise and the cam lever pivot is shifted forwardly. To prevent any possibility of damage to the linkage elements in the event that the movements of the control frame are executed more rapidly than the main valve plunger can follow, the link 88 is constructed so that it is yieldably extensible. To this end, the link is contructed of two telescoping sections normally held in a collapsed condition by a coiled tension spring 91.

Manual regulation of the draft control mechanism is effected through the medium of the quadrant lever 75 which as shown in FIGS. 4 and 7 is fixed to the outer end on a horizontally disposed shaft 92 journalled in a tubular casing 93 seated in and suitably anchored in an opening in the cover plate 54. Fixed to the shaft within the cover plate is a carrier 94 herein shown as a disc carrying an eccentrically mounted stud 95 journalling a roller 96 received between a pair of upstanding jaws 97, 98 formed on and extending upwardly from the cam lever 81 adjacent its pivot. Rocking of the quadrant lever shaft accordingly tends to rock the cam lever about its pivot on the arm 82 when that pivot is stationary. Conversely, shifting of the pivot on the arm 82 will rock the lever about the roller 96 as a pivot when the latter is held stationary.

It will be evident that with the arrangement described, forward swinging of the quadrant lever 75 from the position in which it is shown in FIG. 4 will be effective to rock the cam lever 81 anticlockwise. Such movement transmitted through the link 84 to the valve actuating lever 76 will shift the main valve plunger 63 downwardly to the "drop" position. The valve by permitting exhaust of fluid from the actuator cylinder 53 accordingly allows the lift arms 59 and links 22 to descend under the force of the gravity load thereon lowering the attached implement to the ground. Assuming that the tractor is moved forwardly, the ground engaging elements of the implement are pulled into the soil and as soil reaction builds up the draft load increases drawing the control frame 24 rearwardly. Bell crank 89 follows such movement while the shaft 83 turns with it to shift the pivot of the cam lever 81 rearwardly. This results in pivoting of the cam lever about the roller 96 so that the cam lever now rocks clockwise, allowing the main valve plunger to move back from the "drop" position toward neutral position.

In practice the various elements of the linkage and of the control system are so proportioned that when the draft load corresponds to that designated by the position of the quadrant lever 75, the main valve plunger will be set in neutral position to lock the fluid in the actuator cylinder and thus maintain the hitch and implement at a ground working depth effective to maintain the selected draft load on the hitch. Any change in the draft load will result in a corrective repositioning of the valve plunger 63 to re-establish system equilibrium. Likewise any change in quadrant lever positioning will produce an immediate response in the system to reposition the implement for the newly selected draft load.

*Position control*

As stated above, quadrant lever 75 not only serves to select between draft and position control but it also functions as the position control lever in the latter type of control. For this purpose the disc 94 on the quadrant lever shaft 92 carries a second eccentrically mounted roller 100 positioned to coact with one end of a second cam lever 101. The roller 100 is located on the disc in angularly spaced relation to roller 96 so that it is brought into engagement with the cam lever 101 when the quadrant lever is swung rearwardly from the neutral position shown in FIG. 4.

The cam lever 101 is pivoted adjacent said one end by a pin 102 on a yieldably collapsible double link assembly 103. At its other end the cam lever is pivotally connected to a depending link 104 which has a slot 105 at its lower end receiving the cross pin 85 carried by the valve actuating lever 76. Accordingly when the pivot 102 is stationary, rearward swinging of the quadrant lever will rock the cam lever 101 anticlockwise and through the linkage described move the main valve plunger 63 toward the "drop" position. Due to the pin and slot connection provided in this instance there is no interference with the draft control mechanism previously described.

Link assembly 103 normally acts as a rigid link of fixed length but is capable of counteracting when subject to a thrust force exceeding a predetermined value. At its rear end the link assembly is pivotally connected by a yoke 106 with the lower end of a lever 107 pivotally mounted intermediate its ends by a pin 108 on the housing cover plate 54. The upper end of the lever is positioned to engage a stud 109 fixed to the actuating arm 57 of the lift shaft 58.

The arrangement of the linkage elements is such that when the lift arms 59 are in the fully raised position and the quadrant lever 75 in the transport shut-off position (see FIG. 6), the alternative pivots for the cam lever 101 are positioned so as to set the main valve plunger in neutral position. When the quadrant lever 75 is now swung rearwardly, cam lever 101 is rocked anticlockwise about its pivot 102 shifting the main valve plunger to the "drop" position. This allows the lift shaft 58 to turn in a lowering direction as before explained and the stud 109 is retracted from the lever 107 permiting the lever to rock and the linkage to return the main valve plunger toward the neutral position under the force of the valve biasing spring. As the lift arms reach a position corresponding to that in which the quadrant lever has been set, valve plunger 63 is located in a neutral position and consequently locks fluid in the actuator cylinder to hold the lift mechanism in the selected position. Any change in quadrant lever position is, of course, immediately followed by a corresponding follow-up movement of the lift arms.

*Control of weight transfer*

The control actions above described are those which normally take place when a mounted implement is coupled to the tractor hitch. In the case of semi-mounted implements such as shown in FIG. 1 adjustment of instrument working depth is effected by the auxiliary hydraulic actuator 35 which may be connected to the tractor hydraulic system in a manner well known in the art. With such implements the tractor lift mechanism is utilized to transfer a part of the implement weight to the tractor as previously explained.

Figure 17:
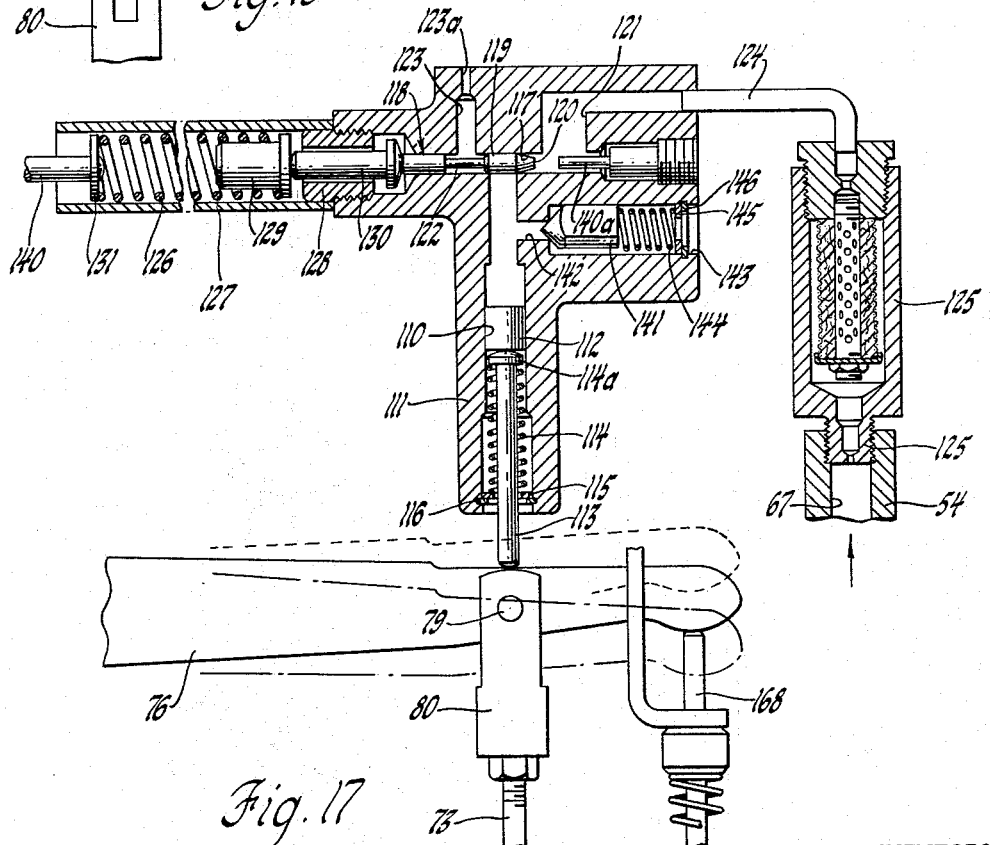
FIG. 17 is a fragmentary, partly sectioned schematic view through the pressure responsive valve means shown in FIG. 12.

In accordance with one aspect of the invention novel means is provided for controlling the pressure acting on the main actuator or lift cylinder 53 so as to maintain a constant lift on the hitch and thus a selected constant weight transfer from the implement to the tractor. The means shown in FIGS. 3–5 and 12–17 includes an auxiliary actuator comprising a cylinder bore 110 formed in a casting 111 mounted on the inner face of the cover plate 54. The cylinder bore is disposed vertically substantially in alinement with the plunger of the main control valve 62. It is fitted with a piston 112 engageable with a plunger 113 (FIG. 17) which at its lower end bears against the valve actuating lever 76 substantially perpendicular to the pin 79 connecting the lever with the valve rod 73. A compression spring 114 acting between a head 114a on the plunger and a stop washer 115 abutting a snap ring 116 in the lower end of the cylinder bore urges the plunger and piston upwardly. Accordingly, the plunger is normally retracted from the valve lever leaving the main valve plunger free for movement by the controls heretofore described.

The cylinder bore 110 opens at its upper end to a transverse valve bore 117 accommodating a movable valve member 118 constituting a part of a pressure responsive mechanism adapted to meter pressure fluid flow into and out of the cylinder bore 110. The valve member has a head portion 119 effective to close off communication to the cylinder bore when in the central position in which it is shown in FIG. 7. The outer end of the head portion is tapered as at 120 so that the cylinder bore may be gradually opened to a pressure inlet passage 121 upon movement of the valve member rearwardly or to the left as viewed in the drawing. Inwardly of the head, the valve member is reduced in diameter as at 122 permitting the cylinder bore to be placed in communication with a drain passage 123 upon outward movement of the valve member. The drain passage opens into the hydraulic system sump through an orifice 123a.

In the exemplary system the pressure inlet passage is connected by conduit means 124 with the supply passage connecting the pump 50 with the main actuator cylinder 53. A filter 125 is desirably interposed in the conduit means 124 to prevent any particles of foreign material from entering the valve bore. The relationship of the various elements of this pressure control mechanism are shown diagrammatically in FIGS. 4 and 17 while the actual connections are illustrated in FIGS. 12 and 13 which show the filter 125 formed with a reduced neck 125a at one end threading into a port connecting with a passage cored in the housing cover plate 54 and constituting a part of the supply passage 67.

It will be apparent that with the above arrangement the outer end of the valve member 118 will be subjected to the pressure prevailing in the actuator cylinder at all times. A balancing pressure is exerted on the other end of the valve member by a coiled compression spring 126 enclosed in a cylindrical casing 127 mounted on the casting 111 by means of a plug 128 pressed into the end of the casing and threaded into a counterbore at the inner end of the valve bore 117. The spring bears against a flanged abutment member 129 which in turn engages the end of a plunger 130 slidable through the plug 128 and abuts the inner end of the valve member 118. At its other end the spring 126 seats against an adjustable stop 131. The pressure in the lift cylinder necessary to move the valve member 118 inwardly is thus dependent on the force exerted by the spring 126, in other words, it is proportional to the linear compression of the spring which can be adjusted by movement of the stop 131 axially of the housing 127.

Manually operable means conveniently accessible to the tractor driver is provided for adjusting the stop 131 to regulate the pressure required to shift the valve member 118. The adjusting means as herein shown comprises a hand lever 132 (FIGS. 3, 4 and 7), adapted to swing over a quadrant 133 mounted alongside and spaced inwardly from the quadrant 75a over which the quadrant lever 75 swings. Lever 132 is fixed to the outer end of a tubular shaft 134 which encloses and is rotatably supported on the quadrant lever shaft 92. At its inner end the shaft 134 is fitted with a crank or disc 135 carrying an eccentrically mounted pin 136 connected by a rigid link 137 with one arm of a bell crank 138 pivoted as at 139 on an internal portion 139a of the housing 20. A rigid link herein shown is a rod 140 which connects the other arm of the bell crank to the stop 131.

By swinging the hand lever 132 through its forward range, the spring 126 may be compressed to select any desired pressure level to be maintained in the lift cylinder within the capacity of the pump.

With the hand lever 132 in its swing forwardly to the position in which it is shown in FIG. 5, the stop 131 is retracted and minimum compression is applied to the spring 126. As the hand lever is swung back toward the position occupied by the quadrant lever in transport position, bell crank 138 is rocked clockwise to advance the rod 140 and stop 131 and thereby increase the pressure on the spring. Assume by way of illustration that the hand lever has been swung to a position calling for a pressure of 500 p.s.i. in the lift cylinder. When the pressure in the cylinder reaches that value, the pressure exerted on the outer end of the valve member 118 will exactly balance that applied to the other end of the valve member by the spring 126 and the valve member will be positioned so as to block cylinder bore 110 against entry or exit to fluid. If pressure should increase above the selected 500 p.s.i., valve member 118 will be forced back in its bore opening the cylinder bore to the pressure inlet 121 and allowing pressure fluid to flow into the cylinder bore. Piston 112 will accordingly be forced downwardly and, through the linkage heretofore described, will shift the main valve plunger toward the neutral position to decrease or eventually interrupt delivery of fluid by the pump. If pressure continues to increase in the system due, for example, to the load on the hitch, the main valve plunger may be shifted beyond the neutral position to the "drop" position, thus permitting fluid to exhaust from the lift cylinder until the desired pressure level, that is the 500 p.s.i. is again established at which time the main valve plunger will be permitted to return to neutral position.

If the pressure in the lift cylinder 53 drops below the 500 p.s.i. selected by the lever 132 because of leakage or change in implement weight effect on the lift links the spring 126 will move the valve member forwardly far enough to open the cylinder bore 110 to the drain 123. This allows fluid to escape from the cylinder bore and spring 114 retracts the plunger 113 from the valve operating lever and urges the piston 112 to the upper end of the cylinder bore. An adjustable stop 140a carried by a plug threaded into the forward end of the valve bore provides a limit stop for determining the limit position of the valve member 118 in its movement toward the drain position.

To safeguard the system from excessive pressure provision is made for limiting the pressure in the cylinder bore 110 to a predetermined value. This means comprises a relief valve including a movable valve element 141 having a tapered end adapted to cooperate with a valve port 142 communicating with the cylinder bore adjacent its upper end. Valve element 141 is formed from cylindrical stock with suitable flats ground on three sides to define passages for exhaust of fluid through the bore 143 in which it is mounted. The valve member is slidable in the bore 143 and is urged to a position to close the port 142 by a compression spring 144 acting against a stop 145 retained in the valve bore by a snap ring 146. The arrangement is such that when pressure fluid supplied to the cylinder exceeds a predetermined relatively low value, as for example 150 p.s.i., valve element 141 will be forced outwardly of the port, allowing fluid to exhaust from the pressure control valve mechanism into the sump until the pressure in the chamber 110 falls to that called for by the valve 141. It will be noted that the valve member 119 normally interrupts communication between the pressure fluid inlet conduit 124 and the chamber 110 when the pressure corresponding to the setting of the spring 126 is reached. If, however, the main control valve or the piston 112 should stick or bind and thus prevent operation of the main valve to close the pump intake, relief valve 141 will then act to relieve the system until the pressure is reduced to the value called for by the spring 126.

Pressure control or modulation is normally used with the quadrant lever 75 at transport position. Pressure control by the auxiliary valve actuator will, of course, override any setting called for by the draft or position control. With the quadrant lever in transport position, cam lever 101 would normally attempt to move the main control valve to intake position and provide full pump pressure on the lift cylinder. If the pressure control lever 132 is moved to a position alined with the quadrant lever transport position, spring 126 is loaded to a degree such that the maximum pressure is available in the system. In practice, the pump is equipped with a relief valve set to open at a pressure usually higher than the setting of the pressure control mechanism.

When the hand lever 132 is swung forwardly, the compressed force on the spring 126 is relaxed. Valve member 118 will therefore be shifted rearwardly and pressure fluid will be admitted to the cylinder 110 to act on the piston 112 and move to the main valve plunger toward the discharge position until the pressure in the system drops to the value designated by the position of the control lever.

In the event that the lever 132 is swung all the way to its limit position, that is, to the position shown in FIG. 5, pressure on the spring 126 will be completely relieved and the auxiliary actuator thereby conditioned to shut off the pump and maintain substantially zero pressure in the system. Thus, the pressure in the lift cylinder and hence the weight transfer to the tractor can be regulated by setting the lever 132 to maintain lift cylinder pressure at any desired level between full maximum pressure permitted by the relief valve and zero pressure.

*System modifying controls*

Settable controls are provided for conditioning the tractor hydraulic system for certain special use such as powering of auxiliary actuators, smoothing the action of the system when operating under automatic control and conditioning the system for operating with implements of widely different weights. As to the first mentioned control, provision is made to maintain the main valve 62 in supply position and continue operation of the pump 50 when the quadrant lever is moved to transport "shut-off" position which normally acts to interrupt fluid delivery by the pump with the hitch raised to transport position. This control, which may be called the auxiliary pump control, includes a cam 150 (FIGS. 4, 5, 10 and 11) positioned for engagement with the upper edge of the position control cam lever 101. The cam 150 is mounted on the inner end of a tubular shaft 151 journalled in the housing cover plate 54 and projecting externally of the cover plate closely adjacent the location of the quadrant lever 75 (see FIG. 5). At its outer end the shaft carries an operating arm 152 terminating in a finger piece by which the shaft can be rocked to selectively position the cam 150 with respect to the cam lever 101. A quadrant plate 153 mounted adjacent the operating arm provides convenient visual indications of the setting of this control.

In the normal or "off" position the auxiliary pump control cam 150 is rocked to the position shown in dotted lines in FIG. 10. It is thus retracted from the cam lever 101 and the lever is left free for its normal controlling function. When the cam is rocked to the "on" position in which it is shown in dot-dash lines in FIG. 10, the cam engages and depresses the forward end of the cam lever, thus pushing down the link 104 to release the valve lever 76 and the main valve plunger for movement to supply position by the valve biasing spring. It will be understood, of course, that the positioning of the quadrant lever 75 in transport "shut-off" position frees the valve actuating lever from control by the draft control cam lever.

Another control conveniently called a limiter control is provided for selectively restricting the range of movement of the main valve plunger toward the exhaust position thereby restricting exhaust of fluid from the main actuating cylinder 53 and limiting the rate of descent of the hitch and the implement coupled to it. Penetration of the implement to a desired working depth and the maintenance of such depth is thus facilitated.

The limiter control in the preferred form shown includes an adjustable stop or abutment member 155 (FIGS. 4 and 11) positioned to coact with the rear end of the valve actuating lever 76 to limit its swing in the direction effective to move the main valve plunger 63 to the exhaust or "drop" position. The abutment member 155 as shown comprises an elongated bar having one end tapered to a point and engageable in an upwardly opening V-shaped notch 156 formed in the valve lever 76 closely adjacent the location of the cross pin 85. At its upper end the abutment member is pivotally secured by a pin 157 to a head 158 formed on the inner end of a shaft 159 extending through and rotatable in the tubular shaft 151. The pin 157 is located eccentrically of the axis of the shaft and is therefore effective to move the abutment member up or down as the shaft is rotated.

Manual rotation of the limiter shaft is effected by an operating arm 160 fixed to the outer end of the shaft as by a pin 161 extending through the shaft and received in suitable notches in a hub 162 formed on the arm. The arm 160 extends across the face of the quadrant plate 153 which is graduated with appropriate indicia for visually indicating the setting of this control.

Since the abutment member 155 cooperates with the valve lever 76 its limiting action on the main valve plunger 63 is effective when the system is operated in either automatic draft or position control. Accordingly, the main valve may be preset to limit the drop rate of the hitch and attached implement to any desired maximum speed within the capacity of the main control valve.

The control mechanism also includes means for damping or regulating the speed of movement of the main valve plunger toward exhaust position by the automatic and manual controls above described. The means employed for that purpose is similar to that disclosed in the Bunting Patent 2,996,125. It comprises a dash pot or damping device 165 including a piston 166 operating in a liquid filled cylinder 167 formed in the housing of the main valve. A rod 168 extending from the piston has its upper end positioned to intercept the forward end of the valve lever 76 in the movement of that lever to shift the valve plunger to exhaust position.

As shown in FIG. 4, the ends of the cylinder 167 are connected by a passage in which is interposed a needle valve 169 adjustable by means of a cam 170 to control the rate of fluid flow through the passage. The cam is carried on a shaft 171 which extends through the tractor housing and is provided with suitable actuating means by which it can be turned to position the cam and adjust the needle valve for optimum operation of the hydraulic system.

*Modification*

FIG. 18 shows a modified form of the pressure responsive weight transfer control. This modified control includes an auxiliary main valve shifting actuator and pressure responsive valve means controlling pressure fluid flow from the hydraulic system actuator to the auxiliary actuator. The actuator itself is similar to that described above including a cylinder bore 175 formed in a casting 176 which intersects a valve bore 177 extending horizontally through the casting. A movable valve member 178 having one end exposed to the system pressure introduced into a pressure inlet 121 is balanced against such pressure by a spring assembly adjustable manually to selectively determine the response level of the valve means.

The spring means acting on the valve member 178 and the adjusting mechanism is precisely like that described heretofore and corresponding elements are identified by the same reference characters. The valve member 178 differs from that previously described and in this instance is slidable axially in a bushing having a stepped bore which is fitted into the valve bore 177. Communication between the interior of the bushing and the cylinder 175 is by way of a port 180 formed in the wall of the bushing. An annular sealing member 181 clamped between the end of the bushing and a shoulder in the valve bore adjacent the pressure inlet chamber is dimensioned to receive the head portion of the plunger 178 with a sealing fit.

The head portion of the valve member 178 is formed with a narrow axially extending slot 182 which, in the balanced position of the member as shown in FIG. 18 allows a small quantity of fluid to flow constantly from the pressure inlet 121 to the cylinder 175. This flow is relieved by leakage around the other end of the valve member which is reduced in diameter as at 183. Fluid leakage past the valve member is returned to the sump by way of an outlet port 184. Thus, when the pressure in the lift cylinder corresponds to that called for by the spring 126, the main control valve will be held in a position to keep the pump operating at a very low delivery rate and in condition to respond very quickly to any change in valve position. In other words, the reacting time for pressure build up in the system is reduced to a minimum.

When the valve member 178 is moved to the right by an increase in pressure on its biasing spring or a decrease in pressure on the hydraulic system, fluid flow through the slot 182 is interrupted. Fluid is permitted to exhaust from the cylinder bore 175 around the reduced end of the valve member as the piston 187 moves upwardly with the main valve plunger on its shift to intake position.

In the exemplary embodiment shown, the cylinder bore 175 is fitted with a piston 185 adapted to engage and push down a plunger 186 which as in the previously described control bears against the valve operating lever 76. Plunger 186 which has a head 187 disposed in the cylinder bore 175 is slidable through a central bore in a bushing 188 threaded into the lower end of the cylinder bore 175. The head 187 is substantially larger than the bore through the bushing and accordingly the bushing is effective to stop the downward movement of the plunger as it shifts the main valve plunger towards the exhaust position. In practice the bushing may be screwed in or out to limit movement of the plunger to a position in which the main control valve is set in neutral position. Accordingly, the weight transfer controls in this instance are ineffective to reduce the pressure in the lift cylinder but simply close the main control valve when pressure reaches a predetermined level. Relief valve 141 limits pressure in the piston chamber 175 as in the case of the valve previously described. It also performs an additional important function. Thus, if the pressure developed in the lift cylinder exceeds that for which the spring 126 is set, valve 178 will remain open and valve 141 will relieve pressure in the entire system until it drops sufficiently to allow the valve 178 to close or until a pressure corresponding to the setting of the relief valve, e.g., 150 p.s.i., is reached.

It will be apparent from the foregoing that the invention provides a power operating and control system of novel and advantageous construction particularly suitable for tractors. Primary control of the hitch and implement coupled thereto is effected conveniently through the medium of a single quadrant lever or manual operator which serves both to select the type of control to be used and the value to be maintained. More specifically, this single manual controller selects between position control and automatic draft control and additionally determines the position or the draft load to be maintained by the controls. It also provides a simple and very effective means for maintaining a constant transfer of weight from the implement to the tractor, this means being conveniently adjustable to insure maintenance of adequate tractive force with any implement that may be coupled to the tractor. Additional controls enable the hydraulic system to be modified for most efficient operation with a wide variety of implements and to insure smooth operation and precise response of the system with all implements.

We claim as our invention:

1. In a hydraulic system for a tractor, including a pressure fluid main actuator for raising and lowering an implement coupled to the tractor, the combination of a pump having a fluid supply connection to the main actuator, valve mechanism including flow control means shiftable from a neutral position in which fluid is locked in the main actuator into alternatively available supply and exhaust positions in which pressure fluid is respectively delivered to the main actuator and drained from the main actuator, means biasing said flow control means toward one of said latter two positions, a second pressure fluid operated actuator operable to shift said flow control means against its bias, pressure responsive means connecting said main actuator and said second actuator for draining said second actuator when the pressure in the main actuator falls below a predetermined value and opening said main actuator to said second actuator when the pressure in the main actuator exceeds the predetermined value and means for adjusting said pressure responsive means to respond to selected different pressures.

2. In a tractor hydraulic system including a pressure fluid operated main actuator connected to apply a lifting force to an implement coupled to the tractor and to thereby transfer a part of the implement weight to the tractor drive wheels, the combination of a pump having a fluid supply connection to the actuator, valve means shiftable from a neutral position in which fluid is locked in the actuator to alternate positions in which the pressure fluid is respectively delivered to the actuator and drained from the actuator, an auxiliary pressure fluid operated actuator operative when actuated to shift said valve means toward the drain position, conduit means connecting said auxiliary actuator to said main actuator, auxiliary valve means interposed in said conduit means including a valve plunger yieldably urged by biasing means toward a position to block fluid flow to and drain the auxiliary actuator and urged in the opposite direction by pressure exerted by the fluid in said main actuator, and manually operative means for adjusting the biasing force exerted on said plunger so as to block delivery of fluid to and drain the auxiliary actuator until the pressure in the system reaches a predetermined value, thereby limiting the lifting force exerted by the main actuator so as to maintain a substantially constant weight transfer to the tractor.

3. In a tractor hydraulic system including a pressure fluid operated main actuator connected to apply a lifting force to an implement coupled to the tractor and to thereby transfer a part of the implement weight to the tractor drive wheels, the combination of a pump having a fluid supply connection to the actuator, valve means shiftable from a neutral position in which fluid is locked in the actuator to alternate positions in which the pressure fluid is respectively delivered to the actuator and drained from the actuator, a second pressure fluid operated actuator operable to shift said valve means toward the drain position, second valve means including a drain for said second actuator and a member urged by the pressure of the fluid in said main actuator to a position to admit pressure fluid to said second actuator, spring means urging said second valve member toward a position effective to block the flow of pressure fluid to, and drain, said second actuator, and manually operable means for adjusting the pressure exerted on said second valve member by said spring means whereby to determine the pressure at which said second actuator becomes operative.

4. In a hydraulic system for a tractor, the combination of a main hydraulic actuator, a pump having an intake and a discharge connected to said main actuator, a drain connection leading from the pump discharge, valve mechanism including flow control means shiftable from a neutral position in which both said pump intake and said drain connection are blocked into alternatively available exhaust and supply positions in which said drain connection and intake are respectively individually opened with the other remaining blocked, means biasing said flow control means toward the supply position, a second hydraulic actuator having a plunger engageable with said flow control means and adapted when supplied with pressure fluid to move said control means against its bias, conduit means connecting said main actuator to said second actuator, pressure responsive means interposed in said conduit means operative to control the supply of fluid to and exhaust of fluid from said second actuator so as to open said pump intake when the pressure in said main actuator falls below a predetermined value and to open said drain connection when the pressure in said main actuator exceeds said predetermined value, and means for adjusting said pressure responsive means to select the particular predetermined pressure at which said pressure responsive means operates.

5. In a tractor hydraulic system including a pressure fluid operated main actuator connected to apply a lifting force to an implement coupled to the tractor and to thereby transfer a part of the implement weight to the tractor drive wheels, the combination of a pump having a fluid supply connection to the actuator, valve mechanism including flow control means shiftable from a neutral position in which fluid is locked in the actuator to alternate positions in which the pressure fluid is respectively delivered to the actuator and drained from the actuator, a second pressure fluid operated actuator operable to shift said flow control means from the delivery position toward the drain position, means responsive to the pressure in said main actuator operable to block the flow of pressure fluid to said second actuator until the pressure in said main actuator exceeds a selected pressure, and relief valve means disposed between said pressure responsive means and said second actuator operative to vent said second actuator at a constant predetermined lower pressure value than said selected value.

6. In a tractor hydraulic system, the combination of a pressure fluid operated main actuator for raising and lowering an implement coupled to the tractor, a pump having a fluid inlet and a pressure flow outlet, conduit means connecting said fluid outlet to a main actuator, a drain connection leading from said outlet, valve mechanism including flow control means shiftable from a neutral position in which fluid is locked in said main actuator into alternative available exhaust and supply positions in which respectively said main actuator and said pump are vented and supply of fluid to the main actuator is initiated, a second pressure fluid operated actuator operable when supplied with fluid under pressure for shifting said flow control means to the venting position, conduit means connecting said main actuator to said second actuator, pressure responsive means interposed in said conduit means between the main actuator and said second actuator operative to block the flow of pressure fluid to the second actuator until the pressure in the system exceeds a predetermined value, and means adjustable manually for varying the pressure at which said pressure responsive means responds to admit pressure fluid to said second actuator.

7. In a tractor hydraulic system, the combination of a pressure fluid operated main actuator for raising and lowering an implement coupled to the tractor, a pump having a fluid inlet and a pressure flow outlet, conduit means connecting said fluid outlet to a main actuator, a drain connection leading from said outlet, valve mechanism including flow control means shiftable from a neutral position in which fluid is locked in said main actuator into alternative available exhaust and supply positions in which respectively said main actuator and said pump are vented and supply of fluid to the main actuator is initiated, a second pressure fluid operated actuator operable when supplied with fluid under pressure for shifting said flow control means toward the venting position, adjustable stop means for said second actuator operative to block movement of the flow control means beyond the neutral position by said second actuator, conduit means connecting said main actuator to said second actuator, pressure responsive means interposed in said conduit means between the said main actuator and said second actuator operative to block the flow of pressure fluid to the second actuator until the pressure in the system exceeds a selected value, and relief valve means between said pressure responsive means and said second actuator operative to vent the same at a constant predetermined lower pressure than said selected value.

8. In a tractor having a vertically swingable implement hitch linkage with means for sensing the draft load imposed on the tractor by the implement, the combination of a hydraulic actuator for raising and lowering the hitch linkage, a source of pressure fluid on the tractor, valve means controlling the delivery of fluid to and exhaust of fluid from said actuator, a valve actuating lever pivoted intermediate its ends on a stationary support and having one end operatively connected with said valve means, linking means interconnecting the other end of said valve actuating lever with a pair of cam elements, a control lever pivotally mounted on the tractor to swing in opposite directions from a neutral position, position control means interposed between said control lever and said linking means with a first follower roller operatively associated with one of said cam elements, said position control means operable jointly with the position of the hitch linkage upon swinging of said control lever in one direction to shift said valve for effecting movement of the hitch linkage to a position corresponding to that of said control lever, and draft control means interposed between said control and said linking means with a second follower roller operatively associated with the other of said cam elements, said draft control means operable jointly with the position of the draft load sensing means upon swinging of said control lever in the other direction to shift said valve means so as to maintain a draft load on said hitch linkage corresponding to the position of said control lever.

9. A tractor having a hydraulic lift system as defined in claim 8 including manually settable stop means for positively limiting the extend of shifting of said valve means in one direction by either of the control linkages.

10. A tractor having a hydraulic lift system as defined in claim 8 including manually adjustable means for limiting the rate of movement of said valve means by either of said control linkages.

11. A tractor having a hydraulic lift system as defined in claim 8 in which each of the control linkages includes a link adapted to yield longitudinally upon movement of any of the link actuating controls when the movement of said valve means is blocked.

12. A tractor having a hydraulic lift system as defined in claim 8 including means adjustable manually for selectively determining the maximum pressure of the fluid delivered to said actuator independently of said control linkages.

13. In a tractor having a vertically swingable implement hitch linkage, the combination of a hydraulic power unit mounted on the tractor and connected to the linkage for raising and lowering the same, a source of pressure fluid, valve means carried on the tractor controlling the supply of pressure fluid to, exhaust from, and locking of fluid in the power unit, position control means operated in accordance with the position of said linkage for operating said valve means to effect movement of the hitch linkage to a selected position, draft control means responsive to the draft load imposed on said hitch linkage for operating said valve means to raise or lower the hitch linkage so as to maintain a substantially uniform selected draft load on the hitch linkage, and manual control means interconnected with said position control means and said draft control means movable to any one of a plurality of positions to cooperate with said position control means to determine said selected position and cooperate with said draft control means to determine said uniform selected draft load pressure control means interconnected with said valve means effective to regulate the pressure of the fluid in said hydraulic power unit when the valve means is in its locking condition, and manually operable means for adjusting said pressure control means to selectively determine the maximum pressure of the fluid in said hydraulic power unit independently of said position and draft control means.

14. A tractor having a hydraulic system as defined in claim 13 in which the adjustment of the pressure control means is effected by connection with said manual control means.

15. In a tractor hydraulic system, the combination of a pressure fluid operated main actuator for raising and lowering an implement coupled to the tractor, a pump having a fluid supply connection with said main actuator, valve mechanism including flow control means shiftable from a neutral position in which fluid is locked in said main actuator into alternative available exhaust and supply positions in which said main actuator is respectively vented and supplied with fluid under pressure, a second pressure fluid operated actuator operable when supplied with fluid under pressure for shifting said flow control means from the supply position toward the neutral position, conduit means connecting said fluid supply connection to said second actuator, pressure responsive means including a shiftable valve member subject to the pressure in said conduit means and urged thereby toward a position to supply pressure fluid to the second actuator, manually adjustable means urging said valve member toward a position to block the fluid supply to said second actuator, said valve member being formed to permit a continuous leakage of fluid from said conduit means to drain when positioned by fluid pressure exactly balancing the pressure exerted by said manually adjustable means, said leakage inducing continued low delivery operation by said pump to insure prompt response of the pump to a call for pressure increase.

16. In a hydraulic system including a pressure fluid actuator adapted to be connected to a load, a pump having a fluid supply connection to said actuator, main valve means shiftable from a neutral position in which fluid is locked in the actuator to alternate positions in which the pressure fluid is respectively delivered to the actuator or exhausted therefrom, the combination including first valve control means for controlling movement of said main valve means between its respective positions to control operation of said actuator, second valve control means including a second fluid operated actuator for controlling movement of said main valve between its delivery position and its neutral position, control valve means connected to said second actuator and responsive to a first predetermined actuator pressure to deliver fluid under pressure to said second actuator for controlling the same and thereby control movement of main valve means between said delivery and neutral positions, and a pressure relief valve connected to said second actuator for limiting the pressure thereon to a second predetermined value less than said first predetermined pressure.

17. The hydraulic system of claim 16 wherein said control valve means has means associated therewith for varying the predetermined pressure required for said control valve means to deliver pressure to the second actuator.

18. The hydraulic system of claim 16 wherein said control valve means is operable to alternatively deliver fluid under pressure to said second actuator or to exhaust fluid therefrom, biasing means for said control valve means, actuator pressure greater than said first predetermined value acting on said control valve means to move the same against said biasing means to a position allowing fluid to act on said second actuator to move said main valve toward its neutral position and simultaneously to exhaust fluid from the first actuator through said relief valve until said actuator pressure is reduced to said predetermined level and said control valve is moved by said biasing means to a closed position.

19. The hydraulic system of claim 18 wherein means are provided to vary the force of said biasing means and hence vary said first predetermined pressure.

20. In a tractor having a vertically swingable implement hitch linkage, the combination of a hydraulic actuator for raising and lowering the hitch, shiftable valve means controlling the operation of said actuator, a valve actuating lever pivoted intermediate its ends on a stationary support and having one end operatively connected with said valve means, a pair of elongated cam elements interconnected at one end to the other end of said valve actuating lever, a first control element adapted to be displaced progressively in proportion to the draft load imposed on the implement hitch, a first roller operatively associated with said first control element so as to engage a cam surface formed on one of said cam elements, a second control element adapted to be shifted in conformity with the position of the implement hitch, a second roller operatively associated with said second control element so as to engage the cam surface formed on the other of said cam elements, a quadrant lever pivoted on a stationary support having a neutral position, means operable by said quadrant lever when swung in one direction from the neutral position for conditioning one of said cam elements to receive valve actuating movements from the control element with which it cooperates, and means operable by said quadrant lever when swung in the opposite direction from the neutral position for conditioning the other of said cam elements to receive valve actuating movements from the control element with which it cooperates.

21. A tractor having a hydraulic lift system as defined in claim 20 including a second pressure fluid operated actuator operable when supplied with fluid under pressure for shifting the valve actuating lever, conduit means connecting the actuator to said second actuator, pressure responsive means interposed in said conduit means between the actuator and said second actuator operative to block the flow of pressure fluid to said second actuator until the pressure in the system exceeds a predetermined value.

22. A tractor having a hydraulic system as defined in claim 21 including means adjustable manually for varying the pressure at which the pressure responsive means responds to admit pressure to the second actuator.

23. A tractor having a hydraulic system as defined in claim 22 including relief valve means disposed between the pressure responsive means and the second actuator to vent the hydraulic pressure fluid from the second actuator at a second predetermined pressure value less than the first predetermined value.

24. In a tractor having a vertically swingable implement hitch linkage, in combination, a hydraulic actuator for raising and lowering the hitch, a pump for supplying pressure fluid to said actuator, shiftable valve means for controlling the supply of pressure fluid to and the exhaust of pressure fluid from said actuator, means biasing said valve means toward a position effective to initiate delivery of fluid to said actuator and thereby to raise the hitch, a first control element movable in conformity with the position of the hitch in its raising and lowering range, a second control element movable in conformity with changes in the draft load imposed on the hitch, valve shifting means including an actuating lever pivoted on a stationary member and having one end operatively connected with said valve means, linking means coupled to the other end of said actuating lever for rocking it against the force imposed by the bias on said valve means to shift the latter toward exhaust position, a first elongated cam element pivotally secured at one end to said linking means and having a cam surface adjacent its other end, a second elongated cam element pivotally secured at one end to said linking means and having a cam surface adjacent its other end, a quadrant lever pivoted on a stationary support and having means engageable with said cam elements as the quadrant lever is swung in opposite directions from a neutral position, said means being operative when said quadrant lever is in neutral position to condition the cam elements for pivotal movements in response to movements of their respective elements without transmitting movement to said actuating lever, said means being further operative when said quadrant lever is alternately moved from said neutral position so that movements by the associated control elements are alternatively effective for imparting pivotal movements to their respective cam elements effective to rock said actuating lever for shifting said valve means.

References Cited by the Examiner

UNITED STATES PATENTS

| | | | |
|---|---|---|---|
| 1,660,720 | 2/1928 | Osborne | 121—38 |
| 2,462,246 | 2/1949 | Worthington et al. | 121—46.5 |
| 2,477,710 | 8/1949 | Worstell. | |
| 2,611,307 | 9/1952 | Strehlow et al. | 172—8 |
| 2,770,222 | 11/1956 | Anderson | 121—38 |
| 2,958,384 | 11/1960 | Hull | 172—2 |
| 2,996,125 | 8/1961 | Bunting | 172—9 |
| 2,998,851 | 9/1961 | Marindin | 172—9 |
| 3,003,568 | 10/1961 | Merritt et al. | 172—9 |
| 3,014,535 | 12/1961 | Marindin | 172—9 |
| 3,062,301 | 11/1962 | Pomper | 172—2 |
| 3,083,777 | 4/1963 | Maughan | 172—9 |

FOREIGN PATENTS

| | | |
|---|---|---|
| 1,238,877 | 7/1960 | France. |
| 632,884 | 12/1949 | Great Britain. |
| 666,325 | 2/1952 | Great Britain. |

ABRAHAM G. STONE, *Primary Examiner.*

F. B. HENRY, R. L. HOLLISTER, *Assistant Examiners.*